(12) United States Patent
Tomita et al.

(10) Patent No.: US 11,661,995 B2
(45) Date of Patent: May 30, 2023

(54) TORQUE FLUCTUATION INHIBITING DEVICE AND TORQUE CONVERTER

(71) Applicant: EXEDY Corporation, Neyagawa (JP)

(72) Inventors: Yusuke Tomita, Neyagawa (JP); Yusuke Okamachi, Neyagawa (JP)

(73) Assignee: Exedy Corporation, Neyagawa (JP)

( * ) Notice: Subject to any disclaimer, the term of this patent is extended or adjusted under 35 U.S.C. 154(b) by 494 days.

(21) Appl. No.: 16/745,685

(22) Filed: Jan. 17, 2020

(65) Prior Publication Data
US 2020/0292030 A1    Sep. 17, 2020

(30) Foreign Application Priority Data

Mar. 13, 2019  (JP) .............................. JP2019-046455

(51) Int. Cl.
| | | |
|---|---|---|
| *F16F 15/131* | (2006.01) | |
| *F16H 45/02* | (2006.01) | |
| *F16F 15/121* | (2006.01) | |
| *F16F 15/14* | (2006.01) | |

(52) U.S. Cl.
CPC .... *F16F 15/13128* (2013.01); *F16F 15/1213* (2013.01); *F16F 15/1428* (2013.01); *F16H 45/02* (2013.01); *F16H 2045/0226* (2013.01)

(58) Field of Classification Search
CPC .......................... F16F 15/1213; F16F 15/1428
See application file for complete search history.

(56) References Cited

U.S. PATENT DOCUMENTS

| | | | |
|---|---|---|---|
| 5,249,659 A | * | 10/1993 | Fukushima ........... F16F 15/167 192/208 |
| 9,732,835 B2 | | 8/2017 | Kawahara et al. |
| 10,107,358 B2 | | 10/2018 | Dinger |
| 10,619,703 B2 | | 4/2020 | Kawahara et al. |
| 10,648,533 B2 | | 5/2020 | Tomiyama |
| 10,718,403 B1 | | 7/2020 | Kitada et al. |

(Continued)

FOREIGN PATENT DOCUMENTS

| | | |
|---|---|---|
| CN | 103671708 A | 3/2014 |
| CN | 203627744 U | 6/2014 |

(Continued)

OTHER PUBLICATIONS

1st Office Action of the related Chinese Patent Application No. 202010146863.5, dated Oct. 18, 2022, 8 pages.

(Continued)

*Primary Examiner* — Vicky A Johnson
(74) *Attorney, Agent, or Firm* — United IP Counselors, LLC (57) ABSTRACT

A torque fluctuation inhibiting device is disclosed. The torque fluctuation inhibiting device includes an input member, an elastic member, a mass body and a centrifugal element. The input member includes a pair of input plates disposed in axial alignment. The input member is disposed to be rotatable. The elastic member is held by the pair of input plates. The mass body is disposed to be rotated with the input member and be rotatable relative to the input member. The centrifugal element is disposed to be radially movable by a centrifugal force acting thereon in rotation of the input member. The centrifugal element is disposed between the pair of input plates.

6 Claims, 7 Drawing Sheets

(56) References Cited

U.S. PATENT DOCUMENTS

| | | | |
|---|---|---|---|
| 10,808,797 B2 | 10/2020 | Tomita et al. | |
| 10,989,290 B2 | 4/2021 | Tomita et al. | |
| 11,149,818 B2 | 10/2021 | Tomita et al. | |
| 11,156,277 B2 | 10/2021 | Nishikawa | |
| 2004/0154896 A1* | 8/2004 | Braford, Jr. | F16F 15/13128 192/212 |
| 2015/0354684 A1* | 12/2015 | Lee | F16F 15/13469 192/3.29 |
| 2016/0333961 A1 | 11/2016 | Dinger | |
| 2018/0328476 A1 | 11/2018 | Suzuki et al. | |
| 2019/0186593 A1 | 6/2019 | Kawahara et al. | |
| 2020/0292030 A1 | 9/2020 | Tomita et al. | |
| 2020/0370620 A1 | 11/2020 | Tomita | |
| 2021/0131525 A1 | 5/2021 | Higuchi et al. | |

FOREIGN PATENT DOCUMENTS

| | | |
|---|---|---|
| CN | 104081082 A | 10/2014 |
| CN | 107850178 A | 3/2018 |
| CN | 107923484 A | 4/2018 |
| CN | 108869687 A | 11/2018 |
| CN | 109154375 A | 1/2019 |
| DE | 102014218621 A1 | 4/2015 |
| JP | 2008-215593 A | 9/2008 |
| JP | 2017-040318 A | 2/2017 |
| JP | 2017-053467 A | 3/2017 |
| JP | 2018-025298 A | 2/2018 |
| JP | 2018-132160 A | 8/2018 |
| JP | 2018-132161 A | 8/2018 |
| JP | 2018-194064 A | 12/2018 |
| JP | 2019-035454 A | 3/2019 |
| JP | 2019-086029 A | 6/2019 |
| JP | 2019-178755 A | 10/2019 |
| WO | 2015/114978 A1 | 8/2015 |
| WO | 2016/000710 A1 | 1/2016 |
| WO | 2018/199325 A1 | 11/2018 |
| WO | 2019/189816 A1 | 10/2019 |

OTHER PUBLICATIONS

Notice of Rejection of the corresponding Japanese Patent Application No. 2019-046455, dated Nov. 1, 2022, 5 pages.

1st Office Action of the corresponding Chinese Patent Application No. 202010169287.6 dated Sep. 28, 2022, 7 pages.

Non-Final OA of copending U.S. Appl. No. 16/744,419, mailed Apr. 4, 2022, 16 pp.

* cited by examiner

Figure 1:
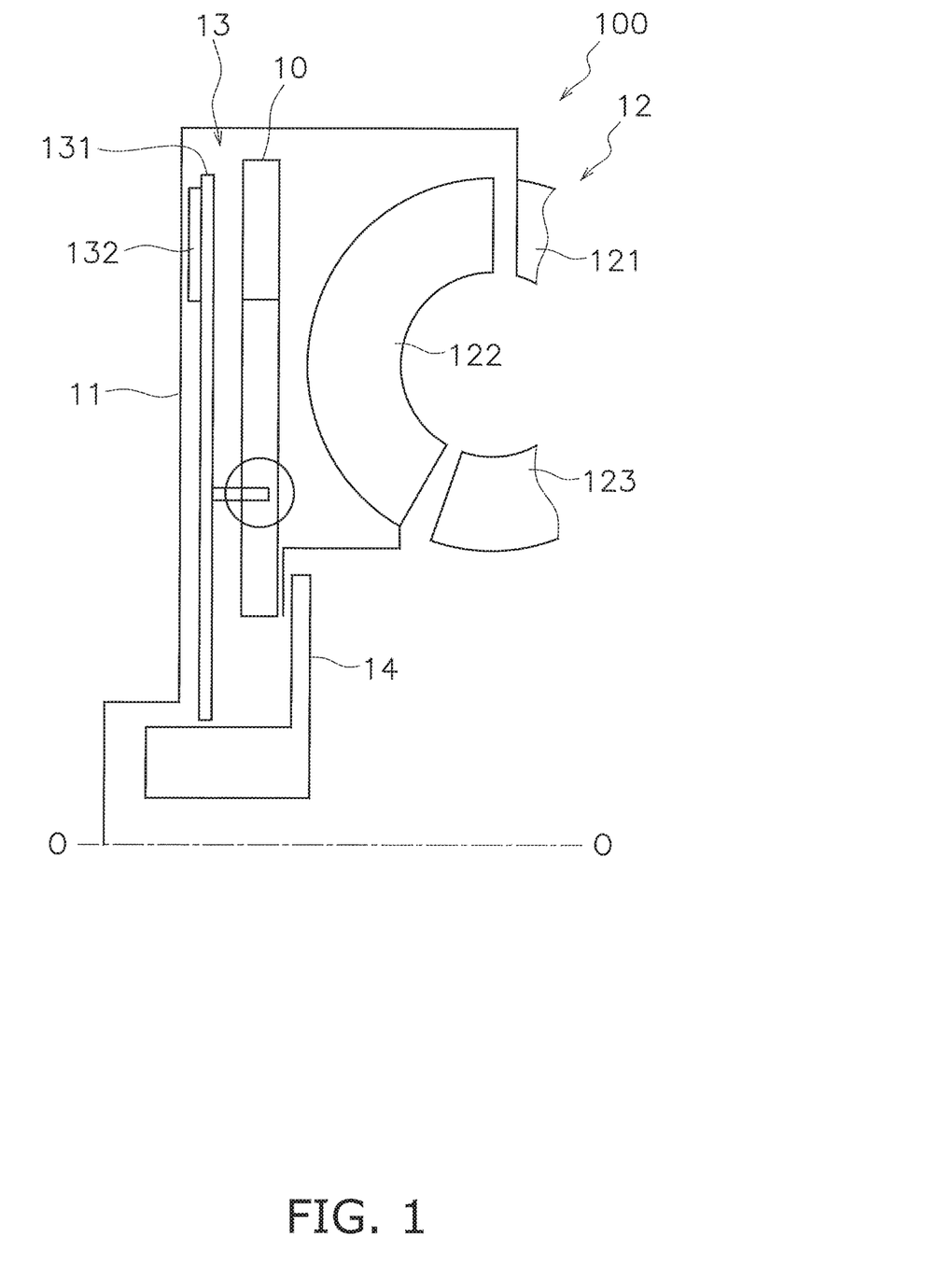
FIG. 1 is a schematic diagram of a torque converter.

A torque fluctuation inhibiting device, which is a preferred embodiment of a rotary device according to the present invention, will be hereinafter explained with reference to drawings. FIG. 1 is a schematic diagram of a condition that the torque fluctuation inhibiting device according to the present preferred embodiment is attached to a lock-up device for a torque converter. It should be noted that in the following explanation, the term "axial direction" refers to an extending direction of a rotational axis O of the torque fluctuation inhibiting device. On the other hand, the term "circumferential direction" refers to a circumferential direction of an imaginary circle about the rotational axis O, whereas the term "radial direction" refers to a radial direction of the imaginary circle about the rotational axis O.

TORQUE FLUCTUATION INHIBITING DEVICE AND TORQUE CONVERTER

CROSS-REFERENCE TO RELATED APPELLATIONS

This application claims priority to Japanese Patent Application No. 2019-046455, filed Mar. 13, 2019. The contents of that application are incorporated by reference herein in their entirety.

TECHNICAL FIELD

The present invention relates to a torque fluctuation inhibiting device.

BACKGROUND ART

A torque fluctuation inhibiting device includes an input member and an inertia member. For example, a vibration reduction device, described in Japan Laid-open Patent Application Publication No. 2018-194064, includes a disc member and mass bodies attached to the outer peripheral part of the disc member. A torque, outputted from a lock-up clutch, is inputted to the disc member through damper springs. The damper springs reduce vibration attributed to torque fluctuations occurring when a lock-up state is made.

Such a torque fluctuation inhibiting device as described above has been demanded to be reduced in number of components. In view of this, it is an object of the present invention to provide a torque fluctuation inhibiting device, which can be reduced in number of components, and a torque converter.

BRIEF SUMMARY

A torque fluctuation inhibiting device according to a first aspect of the present invention includes an input member, an elastic member, a mass body and a centrifugal element. The input member includes a pair of input plates disposed in axial alignment. The input member is disposed to be rotatable. The elastic member is held by the pair of input plates. The mass body is disposed to be rotated with the input member and be rotatable relative to the input member. The centrifugal element is disposed to be radially movable by a centrifugal force acting thereon in rotation of the input member. Additionally, the centrifugal element is disposed between the pair of input plates.

According to this configuration, the centrifugal element is disposed between the pair of input plates. Thus, the centrifugal element can be axially supported by the pair of input plates holding the elastic member. In other words, the pair of input plates, holding the elastic member, functions as a component axially holding the centrifugal element. Hence, reduction in number of components is enabled.

Preferably, the input member further includes a plurality of guide members. The plurality of guide members are disposed between the pair of input plates, and guide the centrifugal element.

Preferably, the pair of input plates is disposed apart from each other at an interval at outer peripheral parts thereof while making contact with each other at inner peripheral parts thereof.

Preferably, the torque fluctuation inhibiting device further includes a cam mechanism. The cam mechanism receives the centrifugal force acting on the centrifugal element, and converts the centrifugal force into a circumferential force directed to reduce a torsion angle between the input member and the mass body.

A torque converter according to a second aspect of the present invention includes a torque converter body and the torque fluctuation inhibiting device configured as any of the above. The torque converter body includes an impeller, a turbine and a stator.

Overall, according to the present invention, it is possible to provide a torque fluctuation inhibiting device, which can be reduced in number of components, and a torque converter.

DETAILED DESCRIPTION

[Entire Configuration]

As shown in FIG. 1, a torque converter 100 includes a front cover 11, a torque converter body 12, a lock-up device 13 and an output hub 14. The front cover 11 is a member to which a torque is inputted from an engine. The torque converter body 12 includes an impeller 121 coupled to the front cover 11, a turbine 122 and a stator 123. The turbine 122 is coupled to the output hub 14. An input shaft of a transmission (not shown in the drawings) is spline-coupled to the output hub 14.

[Lock-Up Device 13]

The lock-up device 13 includes a clutch part, a piston to be actuated by hydraulic pressure, and so forth, and can be set to a lock-up on state and a lock-up off state. In the lock-up on state, the torque inputted to the front cover 11 is transmitted to the output hub 14 through the lock-up device 13 without through the torque converter body 12. On the other hand, in the lock-up off state, the torque inputted to the front cover 11 is transmitted to the output hub 14 through the torque converter body 12.

The lock-up device 13 includes an input-side rotor 131 and a torque fluctuation inhibiting device 10.

The input-side rotor 131 is rotatable relative to the output hub 14. The input-side rotor 131 includes the piston axially movable, and is provided with a friction material 132 fixed to the front cover 11-side lateral surface thereof. When the friction material 132 is pressed onto the front cover 11, the torque is transmitted from the front cover 11 to the input-side rotor 131.

[Torque Fluctuation Inhibiting Device 10]

Figure 2:
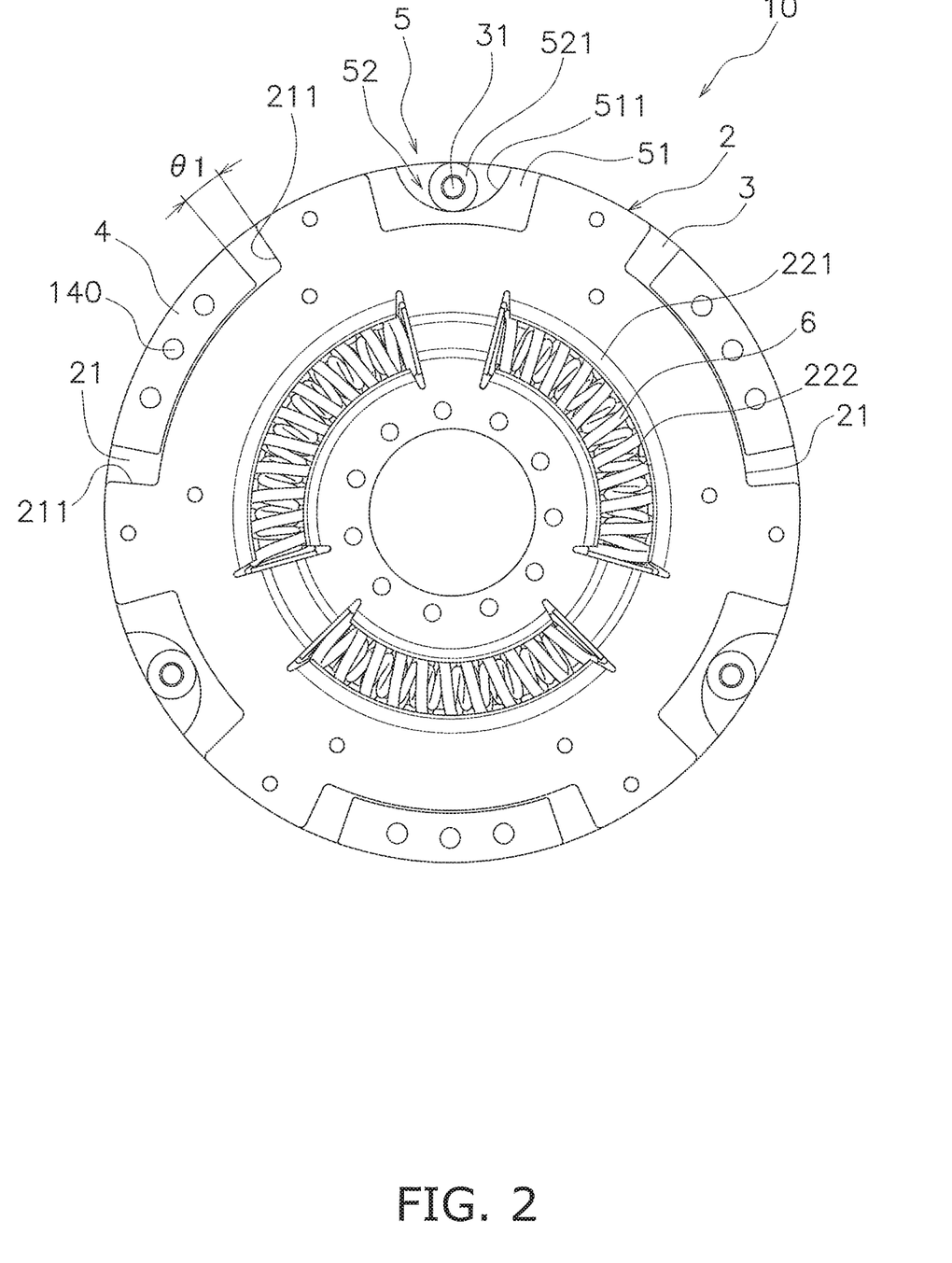
FIG. 2 is a front view of a torque fluctuation inhibiting device.
Figure 3:
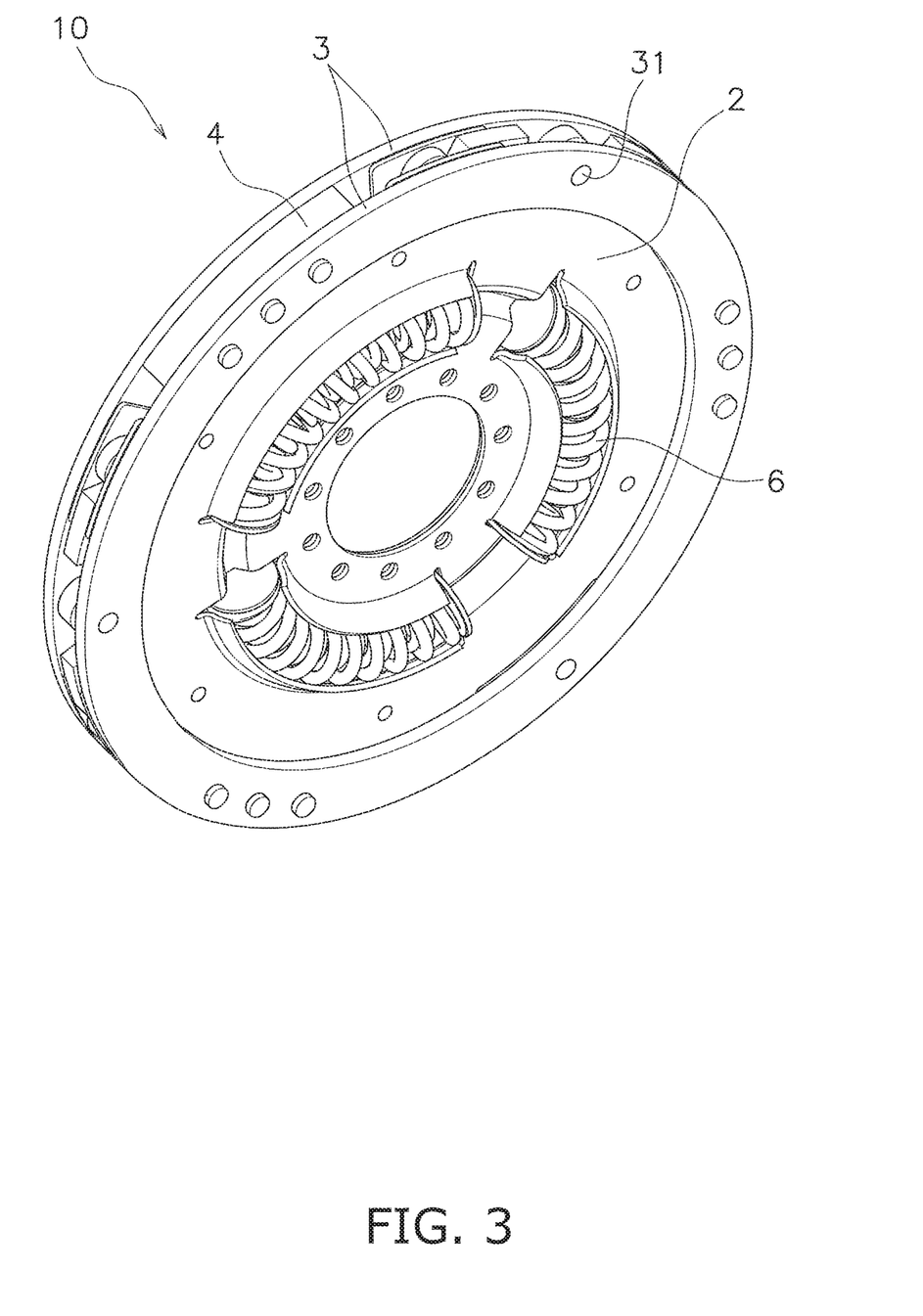
FIG. 3 is a perspective view of the torque fluctuation inhibiting device.

FIG. 2 is a front view of the torque fluctuation inhibiting device 10, whereas FIG. 3 is a perspective view of the torque fluctuation inhibiting device 10. It should be noted that one of inertia rings (near-side inertia ring) is detached in FIG. 2.

As shown in FIGS. 2 and 3, the torque fluctuation inhibiting device 10 includes an input member 2, a pair of inertia rings 3 (exemplary mass body), a plurality of inertia blocks 4, a plurality of variable stiffiiess mechanisms 5 and a plurality of elastic members 6.

<Input Member 2>

The input member 2 is a member to which a torque is inputted. Detailedly, the input member 2 is a member to which the torque is inputted from the input-side rotor 131 through the elastic members 6. The input member 2 is disposed to be rotatable. The input member 2 is disposed in axial opposition to the input-side rotor 131. The input member 2 is rotatable relative to the input-side rotor 131. The input member 2 is coupled to the output hub 14. In other words, the input member 2 is unitarily rotated with the output hub 14.

The input member 2 has an annular shape. The input member 2 is coupled at the inner peripheral part thereof to the output hub 14. The input member 2 includes a plurality of accommodation portions 21. The accommodation portions 21 are provided in the outer peripheral part of the input member 2, and are opened radially outward. Each accommodation portion 21 extends in the circumferential direction.

Figure 4:
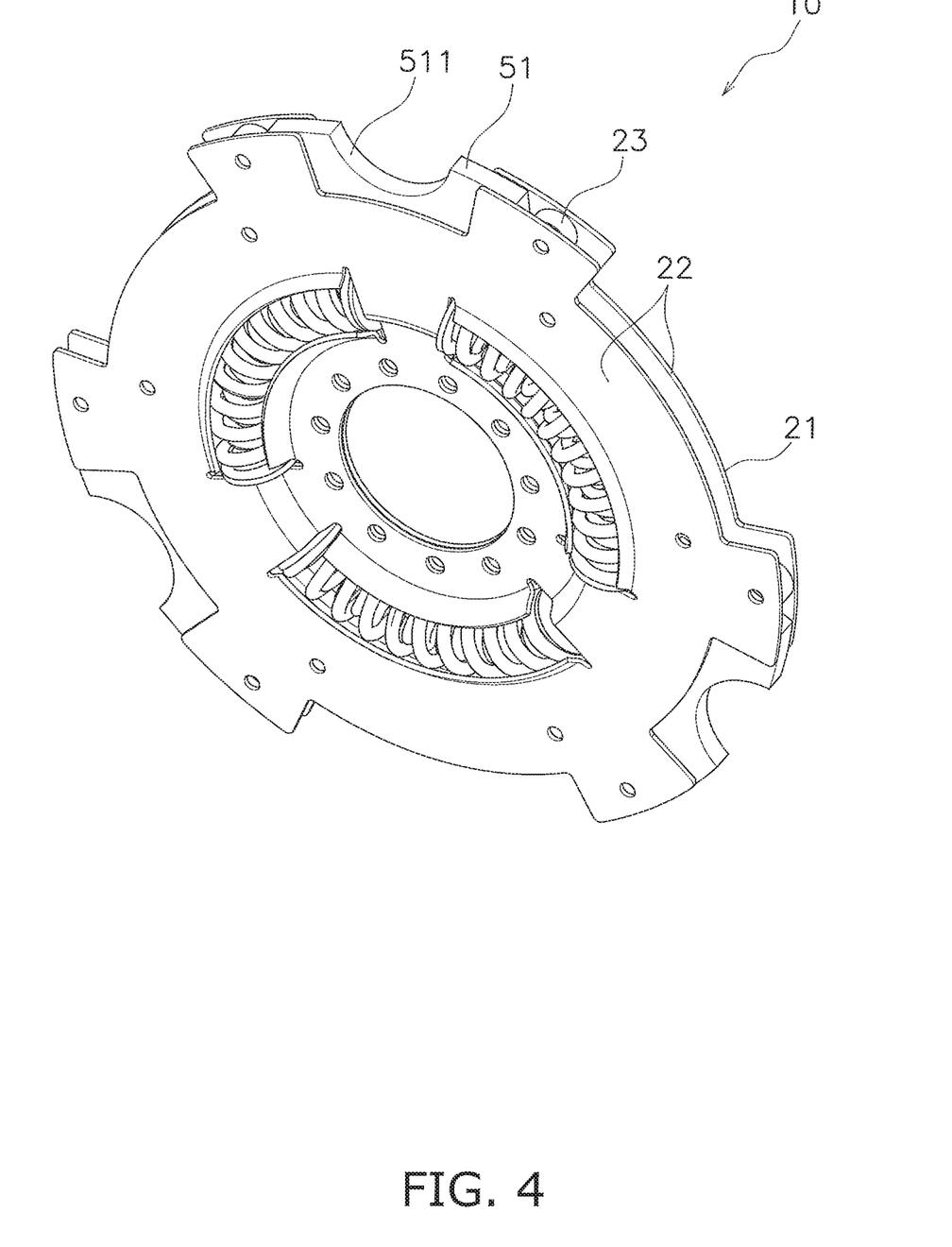
FIG. 4 is a perspective view of the torque fluctuation inhibiting device.
Figure 5:
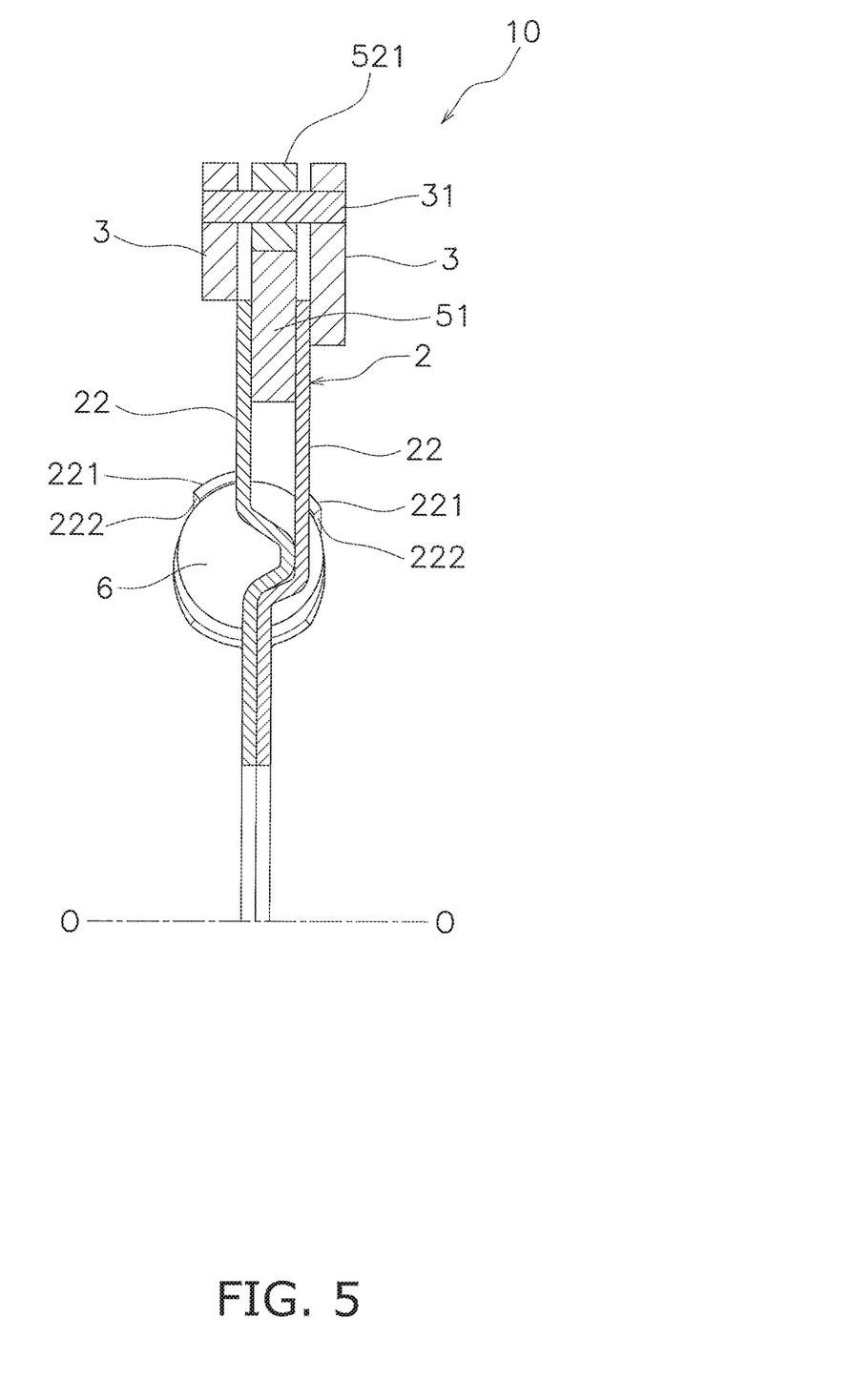
FIG. 5 is a cross-sectional view of the torque fluctuation inhibiting device.

FIG. 4 is a perspective view of the torque fluctuation inhibiting device 10, whereas FIG. 5 is a cross-sectional view of the torque fluctuation inhibiting device 10. It should be noted that the pair of inertia rings 3, a member unitarily rotated therewith and so forth are detached in FIG. 4.

As shown in FIGS. 4 and 5, the input member 2 includes a pair of input plates 22. The pair of input plates 22 is disposed in axial alignment. The pair of input plates 22 is disposed apart from each other at an interval in the axial direction at the outer peripheral parts thereof. The pair of input plates 22 holds the elastic members 6 at the inner peripheral parts thereof. Additionally, the pair of input plates 22 makes contact with each other at the inner peripheral parts thereof.

Figure 6:
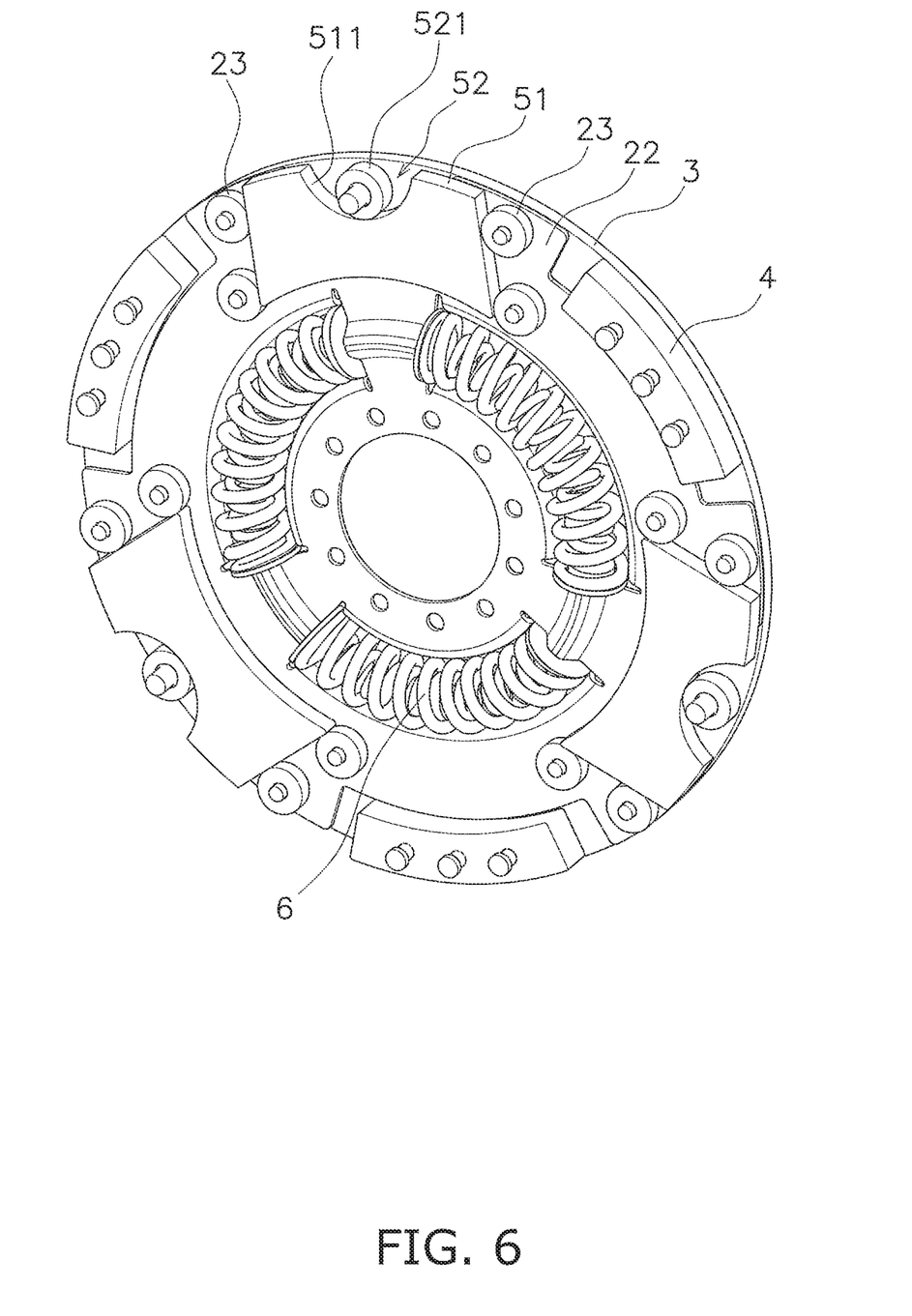
FIG. 6 is a perspective view of the torque fluctuation inhibiting device.

As shown in FIG. 6, the input member 2 includes a plurality of guide members 23. The guide members 23 are disposed between the pair of input plates 22. The guide members 23 guide radial movement of centrifugal elements 51. Detailedly, the plural guide members 23 are disposed at intervals in the circumferential direction. Additionally, each centrifugal element 51 is disposed circumferentially between pairs of guide members 23. With this layout, the pairs of guide members 23 hold each centrifugal element 51 in the circumferential direction. The guide members 23 are, for instance, guide rollers. The guide members 23 are attached to the pair of input plates 22 so as to be rotatable on the spot. When the centrifugal elements 51 are radially moved, the guide members 23 rotate on the spot. Accordingly, the centrifugal elements 51 are radially smoothly movable.

<Inertia Rings 3>

As shown in FIG. 3, each inertia ring 3 is an annular plate. Detailedly, each inertia ring 3 has a continuous annular shape. The radial position of the outer peripheral surface of each inertia ring 3 is substantially the same as that of the outer peripheral surface of each input plate 22. The pair of inertia rings 3 functions as a mass body of the torque fluctuation inhibiting device 10.

As shown in FIG. 5, the pair of inertia rings 3 is disposed to interpose the input member 2 therebetween. The pair of inertia rings 3 is disposed axially on the both sides of the input member 2. In other words, the input member 2 and the pair of inertia rings 3 are disposed in axial alignment. The pair of inertia rings 3 has a rotational axis common to the input member 2.

The pair of inertia rings 3 is fixed to each other by rivets 31. Therefore, the pair of inertia rings 3 is axially, radially and circumferentially immovable relative to each other.

The pair of inertia rings 3 is disposed to be rotatable together with the input member 2 and be rotatable relative to the input member 2. In other words, the pair of inertia rings 3 is elastically coupled to the input member 2. Detailedly, the pair of inertia rings 3 is elastically coupled to the input member 2 through the variable stiffness mechanisms 5.

<Inertia Blocks 4>

As shown in FIGS. 2 and 3, the inertia blocks 4 are disposed between the pair of inertia rings 3. Each inertia block 4 extends in the circumferential direction. Each inertia block 4 is larger in circumferential dimension than in radial dimension. Each inertia block 4 is made of, for instance, metal. It should be noted that the density of each inertia block 4 can be set to be smaller than that of each inertia ring 3. Alternatively, each inertia block 4 can be sintered metal.

The inertia blocks 4 are discrete members separated from the pair of inertia rings 3. The inertia blocks 4 are attached to the pair of inertia rings 3. In other words, the inertia blocks 4 are unitarily rotated with the pair of inertia rings 3. The inertia force of the pair of inertia rings 3 is increased by the inertia blocks 4 thus attached thereto. It should be noted that the inertia blocks 4 are attached to the pair of inertia rings 3 by a plurality of rivets 140.

The plural inertia blocks 4 are disposed apart from each other at intervals in the circumferential direction. The inertia blocks 4 are accommodated in the accommodation portions 21 of the input member 2, respectively. The pair of inertia rings 3, to which the inertia blocks 4 are attached, is rotated relative to the input member 2. Because of this, when a torsion angle between the input member 2 and the pair of inertia rings 3 reaches a threshold B 1, each inertia block 4 makes contact with one of inner wall surfaces 211 of each accommodation portion 21. In other words, the input member 2 and the pair of inertia rings 3 are not rotated relative to each other at a torsion angle of more than the threshold B 1. It should be noted that each inner wall surface 211 of each accommodation portion 21 faces in the circumferential direction.

The inertia blocks 4 are disposed on the circumference of an imaginary circle, on which the centrifugal elements 51 are disposed. The radial position of the outer peripheral surface of each inertia block 4 is substantially the same as that of the outer peripheral surface of each inertia ring 3.

<Variable Stiffness Mechanisms 5>

As shown in FIG. 2, the variable stiffness mechanisms 5 are configured to change a torsional stiffness between the input member 2 and the pair of inertia rings 3 in accordance with the rotational speed of the input member 2 or the pair of inertia rings 3. It should be noted that in the present preferred embodiment, the variable stiffness mechanisms 5 are configured to change the aforementioned torsional stiffness in accordance with the rotational speed of the input member 2. Detailedly, the variable stiffness mechanisms 5 increase the torsional stiffness between the input member 2 and the pair of inertia rings 3 with increase in rotational speed of the input member 2.

Each variable stiffness mechanism 5 includes the centrifugal element 51 and a cam mechanism 52. The centrifugal element 51 is attached to the input member 2. Detailedly, the centrifugal element 51 is disposed between the pair of input plates 22. The centrifugal element 51 is axially held by the pair of input plates 22. Additionally, the centrifugal element 51 is circumferentially held by the pairs of guide members 23.

The centrifugal element 51 is movable in the radial direction by a centrifugal force acting thereon in rotation of the input member 2. The centrifugal element 51 is disposed between the pair of input plates 22 so as to be movable in the radial direction. Additionally, when the centrifugal element 51 is moved in the radial direction, the pairs of guide members 23 rotate on the spot. Accordingly, the centrifugal element 51 can be smoothly moved in the radial direction. It should be noted that the centrifugal element 51 can include a protruding portion (or portions) axially protruding. The protruding portion (or portions) is engaged with a through hole (or holes) provided in either (or both) of the pair of input plates 22 and so forth, whereby the centrifugal element 51 can be restricted from moving axially inward.

The centrifugal element 51 includes a cam surface 511. The cam surface 511 is made in the shape of a circular arc recessed radially inward as seen in a front view (along the axial direction as shown in FIG. 2). It should be noted that the cam surface 511 is the outer peripheral surface of the centrifugal element 51. As described below, the cam surface 511 of the centrifugal element 51 functions as a cam of the cam mechanism 52.

When torsion (relative displacement in the circumferential direction) is produced between the input member 2 and the pair of inertia rings 3 while a centrifugal force is acting on the centrifugal element 51, the cam mechanism 52 converts the centrifugal force into a circumferential force directed to reduce the torsion angle.

The cam mechanism 52 is composed of a cam follower 521 and the cam surface 511 of the centrifugal element 51. It should be noted that the cam surface 511 of the centrifugal element 51 functions as the cam of the cam mechanism 52. The cam follower 521 is attached to the rivet 31. In other words, the cam follower 521 is supported by the rivet 31. It should be noted that the cam follower 521 is preferably attached to the rivet 31 in a rotatable manner, but alternatively, can be attached thereto in a non-rotatable manner. The cam surface 511 is a surface with which the cam follower 521 makes contact, and is made in the shape of a circular arc as seen in the axial direction. The cam follower 521 is moved along the cam surface 511 when the input member 2 and the pair of inertia rings 3 are rotated relative to each other within a predetermined angular range.

When the torsion angle (rotational phase difference) is produced between the input member 2 and the pair of inertia rings 3 by the contact between the cam follower 521 and the cam surface 511, the centrifugal force generated in the centrifugal element 51 is converted into the circumferential force by which the torsion angle is reduced.

<Elastic Members>

As shown in FIG. 5, the elastic members 6 are held by the pair of input plates 22. Detailedly, the elastic members 6 are held by cut-and-raised portions 221 provided in the pair of input plates 22. The elastic members 6 are exposed through pairs of window portions 222 provided in the pair of input plates 22, respectively.

The elastic members 6 are compressed and extended in the circumferential direction. The elastic members 6 are coil springs. The centrifugal elements 51 are disposed radially on the outer side of the elastic members 6. Specifically, the variable stiffness mechanisms 5 including the centrifugal elements 51 are disposed radially on the outer side of the elastic members 6.

A torque, outputted from the input-side rotor 131, is inputted to the elastic members 6. The torque, outputted from the input-side rotor 131, is inputted through the elastic members 6 to the pair of input plates 22.

[Actuation of Torque Fluctuation Inhibiting Device]

Next, actuation of the torque fluctuation inhibiting device 10 will be explained.

In the lock-up on state, the torque transmitted to the front cover 11 is transmitted to the input member 2 through the input-side rotor 131 and the elastic members 6.

When torque fluctuations do not exist in torque transmission, the input member 2 and the pair of inertia rings 3 are rotated in the condition shown in FIG. 2. In this condition, the cam follower 521 in each cam mechanism 52 makes contact with the radial innermost position (circumferential middle position) of the cam surface 511. Additionally in this condition, the torsion angle between the input member 2 and the pair of inertia rings 3 is substantially "0".

Figure 7:
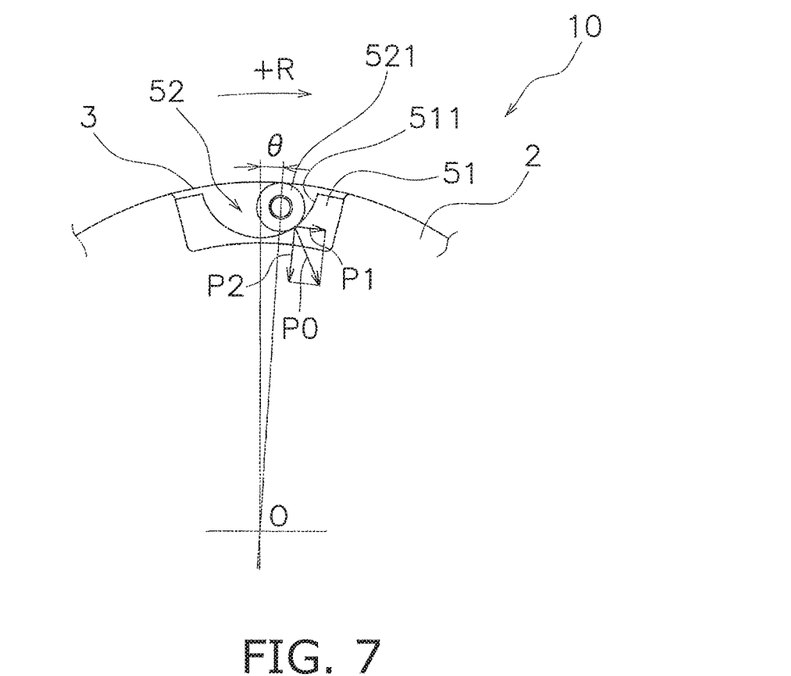
FIG. 7 is an enlarged view of the torque fluctuation inhibiting device in a displaced state (at a torsion angle θ).

It should be noted that in FIGS. 2 and 7, the torsion angle between the input member 2 and the pair of inertia rings 3 indicates circumferential displacement between the circumferential middle position of the centrifugal element 51 and the cam surface 511 and the center position of the cam follower 521.

When torque fluctuations herein exist in torque transmission, a torsion angle θ is produced between the input member 2 and the pair of inertia rings 3 as shown in FIG. 7. FIG. 7 shows a condition that a torsion angle +θ1 is produced to a +R side.

As shown in FIG. 7, when the torsion angle +θ is produced between the input member 2 and the pair of inertia rings 3, the cam follower 521 in each cam mechanism 52 is relatively moved along the cam surface 511 to the right side in FIG. 7. At this time, a centrifugal force acts on the centrifugal element 51. Hence, a reaction force to be received by the cam surface 511 provided on the centrifugal element 51 from the cam follower 521 has a direction and a magnitude indicated by P0 in FIG. 7. A first force component P1 and a second force component P2 are produced by the reaction force P0. The first force component P1 is directed in the circumferential direction, whereas the second force component P2 is directed to move the centrifugal element 51 radially inward.

Additionally, the first force component P1 acts as a force to move the input member 2 rightward in FIG. 7 through each cam mechanism 52 and the centrifugal element 51. In other words, a force directed to reduce the torsion angle θ between the input member 2 and the pair of inertia rings 3 is supposed to act on the input member 2. On the other hand, the second force component P2 moves the centrifugal element 51 to the inner peripheral side against the centrifugal force.

It should be noted that when the torsion angle is reversely produced, the cam follower 521 is relatively moved along the cam surface 511 to the left side in FIG. 7. However, the aforementioned actuation principle is also true of this case.

As described above, when the torsion angle is produced between the input member 2 and the pair of inertia rings 3 by torque fluctuations, the input member 2 receives a force (first force component P1) directed to reduce the torsion angle between the both by the centrifugal force acting on the centrifugal element 51 and the working of each cam mechanism 52. Torque fluctuations are inhibited by this force.

The aforementioned force inhibiting torque fluctuations varies in accordance with the centrifugal force, in other words, the rotational speed of the input member 2, and also varies in accordance with the rotational phase difference and the shape of the cam 511. Therefore, by suitably setting the shape of the cam surface 511, characteristics of the torque fluctuation inhibiting device 10 can be made optimal in accordance with the specification of the engine and so forth.

For example, the cam surface 511 can be made in a shape that makes the first force component P1 linearly vary in accordance with the torsion angle in a condition where the centrifugal force acting is constant. Alternatively, the cam surface 511 can be made in a shape that makes the first force component P1 non-linearly vary in accordance with the rotational phase difference.

As described above, the force applied by the torque fluctuation inhibiting device 10 so as to inhibit torque fluctuations varies in accordance with the rotational speed of the input member 2. Specifically, when a drive source such as the engine is rotated at a high speed, the input member 2 is also rotated at a high speed. Hence, the centrifugal force acting on the centrifugal element 51 is large. Because of this, the torsional stiffness is also made large by each variable stiffness mechanism 5, whereby the torsion angle between the input member 2 and the pair of inertia rings 3 becomes small. On the other hand, when the drive source such as the engine is rotated at a low speed, the input member 2 is also rotated at a low speed. Hence, the centrifugal force acting on the centrifugal element 51 is small. Because of this, the torsional stiffness is also made small by each variable stiffness mechanism 5, whereby the torsion angle between the input member 2 and the pair of inertia rings 3 becomes large.

[Exemplary Characteristics]

Figure 8:
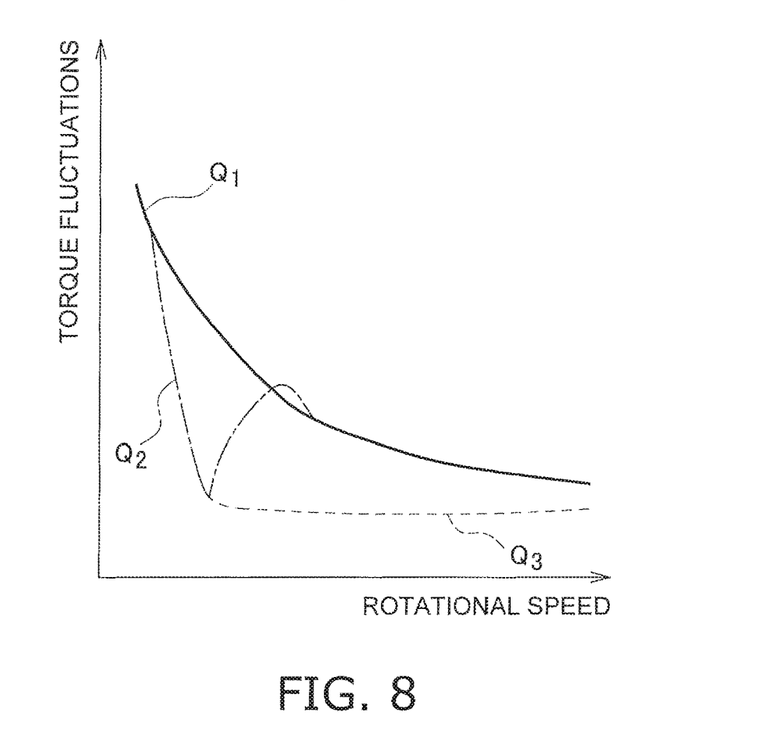
FIG. 8 is a chart showing a relation between rotational speed and torque fluctuations.

FIG. 8 is a diagram showing exemplary characteristics of the torque fluctuation inhibiting device 10. The horizontal axis indicates rotational speed, whereas the vertical axis indicates torque fluctuations (rotational speed fluctuations). Characteristic Q1 indicates a condition without installation of a device for inhibiting torque fluctuations; characteristic Q2 indicates a condition with installation of a well-known dynamic damper device without any cam mechanism; and characteristic Q3 indicates a condition with installation of the torque fluctuation inhibiting device 10 of the present preferred embodiment.

As is obvious from FIG. 8, in an apparatus in which the well-known dynamic damper device without any variable stiffness mechanism is installed (characteristic Q2), torque fluctuations can be inhibited only in a specific rotational speed range. By contrast, in the condition with installation of the torque fluctuation inhibiting device 10 with the variable stiffness mechanisms 5 of the present preferred embodiment (characteristic Q3), torque fluctuations can be inhibited through the entire rotational speed ranges.

[Modifications]

The present invention is not limited to the preferred embodiment described above, and a variety of changes or modifications can be made without departing from the scope of the present invention.

[Modification 1]

In the aforementioned preferred embodiment, the inertia blocks 4 are provided as discrete members separated from the pair of inertia rings 3. However, the structural configuration of the inertia blocks 4 is not limited to this. For example, the inertia blocks 4 can be integrated with at least one of the pair of inertia rings 3 as a single member.

[Modification 2]

In the aforementioned preferred embodiment, the inertia blocks 4 are disposed in the accommodation portions 21 of the input member 2, respectively. However, the positional configuration of the inertia blocks 4 is not limited to this. For example, the inertia blocks 4 can be disposed radially outside the outer peripheral edge of the input member 2. In this case, the input member 2 may not include the accommodation portions 21.

[Modification 3]

In the present preferred embodiment, the inertia blocks 4 are attached to the pair of inertia rings 3. However, the configuration of the torque fluctuation inhibiting device 10 is not limited to this. For example, the torque fluctuation inhibiting device 10 may not include the inertia blocks 4.

[Modification 4]

In the aforementioned preferred embodiment, the elastic members 6 are disposed radially inside the centrifugal elements 51. However, the configuration of the torque fluctuation inhibiting device 10 is not limited to this. For example, the elastic members 6 can be disposed radially outside the centrifugal elements 51.

[Modification 5]

In the aforementioned preferred embodiment, the torque fluctuation inhibiting device 10 is attached to the torque converter 100. Alternatively, the torque fluctuation inhibiting device 10 can be attached to another type of power transmission device such as a clutch device.

REFERENCE SIGNS LIST

2 Input member
22 Input plate
23 Guide member
3 Inertia ring
5 Variable stiffness mechanism
51 Centrifugal element
52 Cam mechanism
6 Elastic member
10 Torque fluctuation inhibiting device
100 Torque converter
12 Torque converter body

What is claimed is:

1. A torque fluctuation inhibiting device comprising:
   an input member disposed to be rotatable, the input member including a pair of input plates, the pair of input plates axially aligned;
   an elastic member held by the pair of input plates;
   a mass body disposed to be rotated with the input member and be rotatable relative to the input member; and
   a centrifugal element disposed between the pair of input plates, the centrifugal element disposed to be radially movable by a centrifugal force acting thereon in rotation of the input member, and the centrifugal element disposed radially outside the elastic member;

wherein the pair of input plates is disposed apart from each other at an interval at outer peripheral parts thereof while making contact with each other at inner peripheral parts thereof.

2. The torque fluctuation inhibiting device according to claim 1, wherein the input member further includes a plurality of guide members, the plurality of guide members disposed between the pair of input plates, the plurality of guide members configured to guide the centrifugal element.

3. The torque fluctuation inhibiting device according to claim 1, further comprising:
a cam mechanism configured to receive the centrifugal force acting on the centrifugal element, the cam mechanism further configured to convert the centrifugal force into a circumferential force directed to reduce a torsion angle between the input member and the mass body.

4. A torque converter comprising:
a torque converter body including an impeller, a turbine and a stator; and
the torque fluctuation inhibiting device according to claim 1.

5. A torque fluctuation inhibiting device comprising:
an input member disposed to be rotatable, the input member including a pair of input plates, the pair of input plates axially aligned;
an elastic member held by the pair of input plates;
a mass body disposed to be rotated with the input member and be rotatable relative to the input member without being sandwiched by the pair of input plates; and
a centrifugal element disposed between the pair of input plates, the centrifugal element disposed to be radially movable by a centrifugal force acting thereon in rotation of the input member;
wherein the pair of input plates is disposed apart from each other at an interval at outer peripheral parts thereof while making contact with each other at inner peripheral parts thereof.

6. A torque fluctuation inhibiting device comprising:
an input member disposed to be rotatable, the input member including a pair of input plates, the pair of input plates axially aligned;
an elastic member held by the pair of input plates;
a mass body disposed to be rotated with the input member and be rotatable relative to the input member;
a centrifugal element disposed between the pair of input plates, the centrifugal element disposed to be radially movable by a centrifugal force acting thereon in rotation of the input member; and
a cam mechanism configured to receive the centrifugal force acting on the centrifugal element, the cam mechanism further configured to convert the centrifugal force into a circumferential force directed to reduce a torsion angle between the input member and the mass body.

* * * * *